US012595195B2

(12) United States Patent
Sandipam et al.

(10) Patent No.: US 12,595,195 B2
(45) Date of Patent: Apr. 7, 2026

(54) METHOD FOR REFINERY WASTEWATER TREATMENT, A SYSTEM AND USES THEREOF

(71) Applicant: INDIAN OIL CORPORATION LIMITED, Mumbai (IN)

(72) Inventors: Srikanth Sandipam, Faridabad (IN); Manoj Kumar, Faridabad (IN); Ravi Prakash Gupta, Faridabad (IN); Suresh Kumar Puri, Faridabad (IN); Sankara Sri Venkata Ramakumar, Faridabad (IN)

(73) Assignee: INDIAN OIL CORPORATION LIMITED

( * ) Notice: Subject to any disclaimer, the term of this patent is extended or adjusted under 35 U.S.C. 154(b) by 644 days.

(21) Appl. No.: 17/977,981

(22) Filed: Oct. 31, 2022

(65) Prior Publication Data

US 2023/0135497 A1     May 4, 2023

(30) Foreign Application Priority Data

Nov. 1, 2021     (IN) ............................. 202121050092

(51) Int. Cl.
| | |
|---|---|
| *C02F 1/463* | (2023.01) |
| *C02F 1/24* | (2023.01) |
| *C02F 1/461* | (2023.01) |
| *C02F 101/10* | (2006.01) |
| *C02F 101/16* | (2006.01) |
| *C02F 101/32* | (2006.01) |
| *C02F 101/34* | (2006.01) |
| *C02F 103/36* | (2006.01) |

(52) U.S. Cl.
CPC ................ *C02F 1/463* (2013.01); *C02F 1/24* (2013.01); *C02F 1/46109* (2013.01); *C02F 2001/46133* (2013.01); *C02F 2101/101* (2013.01); *C02F 2101/16* (2013.01); *C02F 2101/325* (2013.01); *C02F 2101/345* (2013.01); *C02F 2103/365* (2013.01); *C02F 2305/023* (2013.01)

(58) Field of Classification Search
None
See application file for complete search history.

(56) References Cited

U.S. PATENT DOCUMENTS

| | | | |
|---|---|---|---|
| 6,274,028 | B1 | 8/2001 | Hu et al. |
| 6,663,783 | B2 | 12/2003 | Stephenson et al. |
| 8,431,009 | B2 | 4/2013 | Morkovsky et al. |
| 8,663,464 | B2 | 3/2014 | Wiemers et al. |
| 9,682,875 | B2 | 6/2017 | Rigby et al. |
| 2003/0222030 | A1 | 12/2003 | Woytowich et al. |
| 2013/0341267 | A1* | 12/2013 | Prasad ...................... C02F 3/30 |
| | | | 210/605 |

OTHER PUBLICATIONS

Nechita, "Applications of Chitosan in Wastewater Treatment" Biological Activities and Application of Marine Polysaccharides, 2017.
Abou-Taleb et al., 2020. "Electro-oxidation of phenol in petroleum wastewater using a novel pilot-scale electrochemical cell with graphite and stainless-steel electrodes".

* cited by examiner

*Primary Examiner* — Peter Keyworth

(57) ABSTRACT

The present invention relates to a method for refinery wastewater treatment which comprises hybrid electrode system for simultaneous flocculation/coagulation and oxidation in single system. Further, the present invention provides a system for refinery wastewater treatment.

17 Claims, 6 Drawing Sheets

METHOD FOR REFINERY WASTEWATER TREATMENT, A SYSTEM AND USES THEREOF

TECHNICAL FIELD

The present disclosure relates generally to the field of Environmental Sciences and Technology. In particular, the present invention relates to a method and system for refinery wastewater treatment.

BACKGROUND ART

Waste-water treatment is one of the prime aspects for petroleum industry in the context of increasing stringent environmental regulations. Further, water recyclability to reduce the fresh-water consumption and zero discharge has been targeted in many of the petroleum refineries. However, large quantities of flocculants, coagulants, oxidizing agents, pH controllers and other chemicals are being dosed during the treatment process in effluent treatment plant, which significantly reduce the possibility of water recycling and also increase the chemical load in discharge effluents. The major fraction of total chemical dosing in refinery Effluent Treatment Process (ETP) are dosed in flash mixer to remove the emulsified oil content, total solids (TS), color and in turn the chemical oxygen demand (COD) of the wastewater. This will help in smooth operation of biological section of refinery ETP and also to get the final effluent in designated standards. During the unexpected shock loads in routine ETP operation, requirement of chemicals increases significantly and this in turn reduce/eliminate the possibility of water recycling. This also increases the load on biological unit operations and destabilizes them affecting the whole ETP operational flow.

U.S. Pat. No. 6,663,783B2 relates to the design of an electrochemical cell for removing the contaminants from wastewater. The invention is based on design of a new electrochemical cell that uses sacrificial electrodes to remove the contaminants from wastewater. This invention does not address the oxidation or removal of complex pollutants, low retention times, increased water recyclability and low chemical dosing.

U.S. Pat. No. 8,431,009B2 relates to an electrocoagulation reactor design for removing the contaminants from wastewater. The invention is based on a rectangular electrocoagulation reactor design that can be used in series to remove the contaminants from wastewater. This invention does not address the oxidation or removal of complex pollutants, low retention times, increased water recyclability and low chemical dosing.

U.S. Pat. No. 8,663,464B2 relates to the apparatus and method for enhanced electrocoagulation process using membrane aeration. This invention is based on using membrane based set up for increased supply of ionized air into the electrocoagulation reactor to enhance the treatment efficiency. This invention does not address the oxidation or removal of complex pollutants, low retention times, withstanding shock loads, increased water recyclability and low chemical dosing.

U.S. Pat. No. 9,682,875 B2 relates to electrochemical system and method for the treatment of water and wastewater. This invention is based on using electrode arrangement in an electrochemical system to enhance the treatment efficiency. This invention does not address the oxidation or removal of complex pollutants, low retention times, withstanding shock loads, increased water recyclability and low chemical dosing.

United States Patent US 2003/0222030 A1 relates to method and electrode construction for electrocoagulation treatment of water and wastewater. This invention is based on improved design of electrochemical system for the treatment of water and wastewater. This invention does not address the oxidation or removal of complex pollutants, low retention times, increased water recyclability and low chemical dosing.

U.S. Pat. No. 6,274,028B1 relates to a method and reactor design based on electrochemical oxidation of pollutants in wastewater. This invention is based on oxidation of pollutants at series of electrochemical cells under applied potentials, especially targeting the COD of wastewater. This invention does not address the removal of suspended solids, low retention times, withstanding shock loads, increased water recyclability and low chemical dosing.

WO2011131889A1 related to a method for treating industrial effluent such as phenolic spent caustics and associated device. This invention depicts a method for treating the high concentrations of phenols and sulfides from refinery ETPs via electrochemical oxidation. This invention does not address the removal of suspended solids, low retention times, withstanding shock loads, increased water recyclability and low chemical dosing.

El-Naas, M. H et al., 2009. Assessment of electrocoagulation for the treatment of petroleum refinery wastewater. Journal of Environmental Management. 91 (1), 180-185. This publication is based on electrocoagulation of petroleum wastewater targeted for removal of sulfates and COD. This invention does not address the oxidation or removal of complex pollutants, low retention times, increased water recyclability and low chemical dosing.

Laura et al., 2016. Oil refinery wastewater treatment using coupled electrocoagulation and fixed film biological processes. Physics and Chemistry of the Earth. 91, 53-60. This manuscript is based on electrocoagulation for the removal of petroleum hydrocarbons and COD. This invention does not address the oxidation or removal of complex pollutants, low retention times, withstanding shock loads, increased water recyclability and low chemical dosing.

Hernández-Francisco et al., 2017. Removal of phenolic compounds from oil refinery wastewater by electrocoagulation and Fenton/photo-Fenton processes. Journal of Water Process Engineering. 19, 96-100. This publication is based on removal of phenolic compounds from refinery wastewater using an integrated process but not based on single electrocoagulation process. This invention does not address the oxidation or removal of complex pollutants, low retention times, withstanding shock loads, increased water recyclability and low chemical dosing.

Abou-Taleb et al., 2020. Electro-oxidation of phenol in petroleum wastewater using a novel pilot-scale electrochemical cell with graphite and stainless-steel electrodes. Water and Environment Journal. This publication is based on electro-oxidation of phenolic compounds from petroleum refinery wastewater. This invention does not address the removal of any other contaminants from wastewater, oxidation of other complex pollutants, low retention times, withstanding shock loads, increased water recyclability and low chemical dosing, etc.

The present invention provides a method that produces in situ coagulants/flocculants as well as oxidizing agents under small applied potentials. The method and the system of the present invention can also handle the shock loads and can retrofit to the existing flash mixer and dissolved aeration float (DAF) units to enable the possibility of carrying out all the envisaged contaminant removal without adding or with minimal dosing of chemicals, as well.

All the above-mentioned patent and non-patent literatures are based on constructing electrochemical cells and electrode designs to carry out either coagulation or oxidation process targeting some specific components to enhance the efficiency of ETP. But none of the above mentioned documents discussed about the method of flocculation/coagulation along with simultaneous oxidation of pollutants with reduced retention times for treatment. Also, none of the processes in the art taught regarding handling the shock loads and reduction in chemical dosing in all units of ETP. These are essentially required to transform towards zero liquid discharge targeted ETPs.

OBJECTIVE

It is a primary objective of the invention to provide an efficient method for refinery wastewater treatment. Said method produces in situ coagulants/flocculants as well as oxidizing agents under small applied potentials. The method of the present invention can also handle the shock loads and can retrofit to the existing flash mixer and dissolved aeration float (DAF) units to enable the possibility of carrying out all the envisaged contaminant removal without adding or with minimal dosing of chemicals, as well.

The further objective of the present invention is to provide a system for refinery wastewater treatment.

SUMMARY OF THE INVENTION

The invention provides a method for refinery wastewater treatment said method comprises the steps of:

passing wastewater effluent through a hybrid electrode stack (1), wherein said hybrid electrode stack comprises:

a first part which comprises plurality of hybrid electrodes i.e. hybrid working electrodes (2) composed of sacrificial elements, biological originated coagulants and high conductive electrodes; wherein the high conductive electrodes are coated or filled or mixed with sacrificial metal along with biological originated coagulants; wherein sacrificial metal is selected from aluminum (Al) and/or iron (Fe) or their different forms and biocompatible coagulants are selected from Tannic acid, Galacturonic acid, Sorbitol, chitosan;

a second part which comprises plurality of hybrid electrodes i.e. hybrid counter electrodes (3) arranged in alternate sequence to form a stack and are connected in parallel circuit with the first part; and a non-conductive spacer and electrode header unit (4) for avoiding short circuit between the electrodes; wherein said spacer having the first and second part mounted on it either vertically or horizontally;

wherein said hybrid electrode stack (1) is retrofitted in the flash mixer and Dissolved Air Flotation (DAF) units or placed as a separate unit in refinery effluent treatment plant; and the wastewater is passed at a flow rate to maintain hydraulic retention time (HRT) of 45-60 min and at ambient pressure; obtaining treated water with a purity of 80 to 85%;

wherein the method reduces the chemical dosing requirement and air purging requirement by a minimum of 75% even during the shock loads of Oil and grease, ammonia, phenols and sulfides into refinery wastewater.

Further, the present inventive provides a system for refinery wastewater treatment.

BRIEF DESCRIPTION OF THE DRAWINGS

These and other features, aspects, and advantages of the present invention will become better understood when the following detailed description is read with reference to the accompanying drawings in which like characters represent like parts throughout the drawings wherein.

DETAILED DESCRIPTION

Those skilled in the art will be aware that the present disclosure is subject to variations and modifications other than those specifically described. It is to be understood that the present disclosure includes all such variations and modifications. The disclosure also includes all such steps of the process, features of the invention, referred to or indicated in this specification, individually or collectively, and any and all combinations of any or more of such steps or features.

DEFINITIONS

For convenience, before further description of the present disclosure, certain terms employed in the specification, and examples are collected here. These definitions should be read in the light of the remainder of the disclosure and understood as by a person skilled in the art. The terms used herein have the meanings recognized and known to those of skill in the art, however, for convenience and completeness, particular terms and their meanings are set forth below.

The articles "a", "an" and "the" are used to refer to one or to more than one (i.e., to at least one) of the grammatical object of the article. The terms "comprise" and "comprising" are used in the inclusive, open sense, meaning that additional elements may be included. It is not intended to be construed as "consists of only". Throughout this specification, unless the context requires otherwise the word "comprise", and variations such as "comprises" and "comprising", will be understood to imply the inclusion of a stated element or step or group of elements or steps but not the exclusion of any other element or step or group of elements or steps.

Unless defined otherwise, all technical and scientific terms used herein have the same meaning as commonly understood by one of ordinary skill in the art to which this disclosure belongs. Although any methods and materials similar or equivalent to those described herein can be used in the practice or testing of the disclosure, the preferred methods, and materials are now described. All publications mentioned herein are incorporated herein by reference. The present disclosure is not to be limited in scope by the specific examples described herein, which are intended for the purposes of exemplification only. Functionally equivalent products and methods are clearly within the scope of the disclosure, as described herein.

Figure 2:
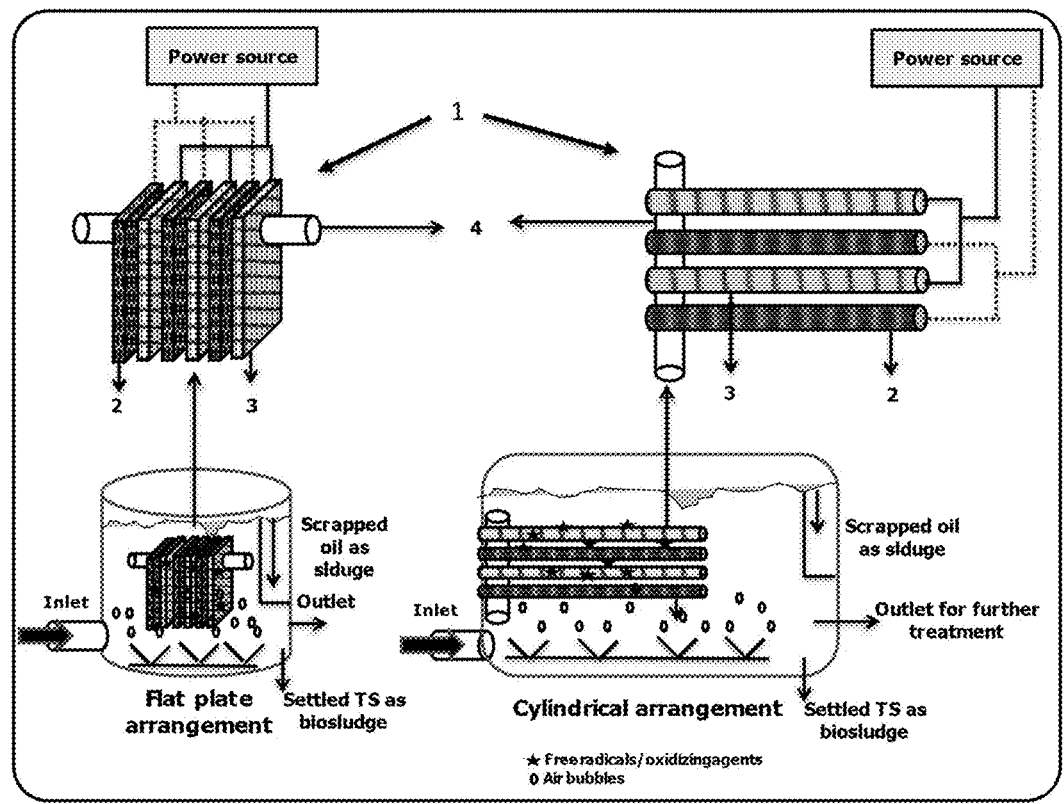
FIG. 2 illustrates two types of hybrid electrode arrangements of the proposed invention in primary treatment unit of refinery ETP.

The existing literatures on electro-assisted processes to enhance the treatment efficiency have addressed only either flocculation/coagulation or oxidation in different chambers but not simultaneously in single system. The present invention is based on method for refinery wastewater treatment which comprises hybrid electrode system for simultaneous flocculation/coagulation and oxidation in single system as shown in FIG. 2. The present invention is highly effective in reducing the HRT for efficient treatment due to the possibility of removal of multiple contaminants in single system unlike the prior art. The present invention is effective in handling of shock loads of ammonia, phenols, O&G, sulfides, COD, BOD, TS, etc., and withstanding the routine ETP operation and supports the stable operation of biological units as well. The present invention enables the removal of most of the contaminants without adding or with minimal dosing of chemicals. Overall, inclusion of the present invention in the existing ETP unit reduce the retention time, increases the water recyclability and allows the refinery ETPs to move towards zero liquid discharge.

In the first aspect, the present invention provides a method for refinery wastewater treatment, wherein said method comprises the steps of:

passing wastewater effluent through a hybrid electrode stack (1), wherein said hybrid electrode stack comprises:
    a first part which comprises plurality of hybrid electrodes i.e. hybrid working electrodes (2) composed of sacrificial elements, biological originated coagulants and high conductive electrodes; wherein the high conductive electrodes are coated or filled or mixed with sacrificial metal along with biological originated coagulants; wherein sacrificial metal is selected from aluminum (Al) and/or iron (Fe) or their different forms and biocompatible coagulants are selected from Tannic acid, Galacturonic acid, Sorbitol, chitosan;
    a second part which comprises plurality of hybrid electrodes i.e. hybrid counter electrodes (3) arranged in alternate sequence to form a stack and are connected in parallel circuit with the first part; and
    a non-conductive spacer and electrode header unit (4) for avoiding short circuit between the electrodes; wherein said spacer having the first and second part mounted on it either vertically or horizontally;
  wherein said hybrid electrode stack (1) is retrofitted in the flash mixer and Dissolved Air Flotation (DAF) units or placed as a separate unit in refinery effluent treatment plant; and the wastewater is passed at a flow rate to maintain hydraulic retention time (HRT) of 45-60 mins and at ambient pressure; obtaining treated water with a purity of 80 to 85%;
  wherein the method reduces the chemical dosing requirement and air purging requirement by a minimum of 75% even during the shock loads of Oil and grease, ammonia, phenols and sulfides into refinery wastewater.

In an embodiment, the sacrificial metal is in the form selected from sheets, plates, powder and nano material.

In another embodiment, the sacrificial metal selected from aluminum (Al) and/or iron (Fe) or their combination based on requirement for wastewater when leached out in their salt form act as flocculants and coagulants and cause the separation of emulsified oil and suspended solids in the wastewater effluents.

In yet another embodiment, the hybrid electrode stacks (1) generate free radicals or oxidizing agents selected from hydronium ions, hydroxyl radicals, nascent oxygen, that can oxidize the organic contents.

In an embodiment, the biocompatible coagulant is coated or filled or mixed with sacrificial electrode to increase the redox balance and the rate of flocculation or coagulation.

In another embodiment, the biocompatible coagulant is mixed at 0.5% (w/w) of the sacrificial electrode material.

In yet another embodiment, the high conductive metal electrodes are based on group consisting of Titanium (Ti) plates or mesh, stainless steel, carbon steel and mixed metal oxide (MMO) based electrodes.

In an embodiment, the mixed metal oxide (MMO) based electrode is Titanium coated by Ruthenium (IV) oxide ($RuO_2$) or Iridium (IV) oxide ($IrO_2$).

In another embodiment, the electrical circuit connections of the electrode stack are to be maintained in such a way that each type of electrode may act as single set of electrodes.

In yet another embodiment, the electrical circuit connections pass through the non-conductive spacers and is a switch between the charge, i.e., anodic or cathodic, for both hybrid working and counter electrodes.

In an embodiment, the electrode polarity is changed in intervals of time, preferably between 2-20 mins to increase the flocculation and enable reuse of the electrode stack by coating again the Al or Fe sheet or plate or powder or nano material on to the high conductive electrode stack.

In another embodiment, the hybrid electrodes (1) can be in flat plate or cylindrical i.e. rod shaped.

In yet another embodiment, the applied potential is between 5-10 V direct current (DC).

In an embodiment, the hydraulic retention time (HRT) is of 50-55 mins.

In another embodiment, the method reduces the chemical dosing requirement and air purging requirement by 75-80%.

In the second aspect, the present invention provides a system for refinery wastewater treatment, wherein said system comprises:

a first part which comprises plurality of hybrid electrodes i.e. hybrid working electrodes (2) composed of sacrificial elements, biological originated coagulants and high conductive electrodes; wherein the high conductive electrodes are coated or filled with sacrificial metal along with biological originated coagulants; wherein sacrificial metal is selected from aluminum (Al) and/or iron (Fe) or their different forms and biocompatible coagulants are selected from Tannic acid, Galacturonic acid, Sorbitol, chitosan;

a second part which comprises plurality of hybrid electrodes i.e. hybrid counter electrodes (3) arranged in alternate sequence to form a stack and are connected in parallel circuit with the first part;

a non-conductive spacer and electrode header unit (4) for avoiding short circuit between the electrodes; wherein said spacer having the first and second part mounted on it either vertically or horizontally; and wherein said system generates coagulants or flocculants and free radicals or oxidizing agents simultaneously for faster treatment and efficient handling of shock loads of multiple contaminants during refinery wastewater treatment.

In an embodiment, the sacrificial metal is in the form selected from sheets, plates, powder and nano material.

In another embodiment, the sacrificial metal selected from aluminum (Al) and/or iron (Fe) or their combination based on requirement for wastewater when leached out in their salt form act as flocculants and coagulants and cause the separation of emulsified oil and suspended solids in the wastewater effluents.

In yet another embodiment, the hybrid electrode stacks (1) generate free radicals or oxidizing agents selected from hydronium ions, hydroxyl radicals, nascent oxygen, that can oxidize the organic contents.

In an embodiment, the biocompatible coagulant is coated or filled or mixed with sacrificial electrode to increase the redox balance and the rate of flocculation or coagulation.

In another embodiment, the biocompatible coagulant is mixed at 0.5% (w/w) of the sacrificial electrode material.

In yet another embodiment, the high conductive metal electrodes are based on group consisting of Titanium (Ti) plates or mesh, stainless steel, carbon steel and mixed metal oxide (MMO) based electrodes.

In an embodiment, the mixed metal oxide (MMO) based electrode is Titanium coated by Ruthenium (IV) oxide ($RuO_2$) or Iridium (IV) oxide ($IrO_2$).

In another embodiment, the electrical circuit connections of the electrode stack are to be maintained in such a way that each type of electrode may act as single set of electrodes.

In yet another embodiment, the electrical circuit connections pass through the non-conductive spacers and is a switch between the charge, i.e., anodic or cathodic, for both hybrid working and counter electrodes.

In an embodiment, the electrode polarity is changed in intervals of time, preferably between 2-20 min to increase the flocculation and enable reuse of the electrode stack by coating again the Al or Fe sheet or plate or powder or nano material on to the high conductive electrode stack.

In another embodiment, the hybrid electrodes (1) can be in flat plate or cylindrical i.e. rod shaped.

In yet another embodiment, the applied potential is between 5-10 V direct current (DC).

Due to the combined effect of coagulation and oxidation under electric field, the retention time for the treatment of wastewater reduces drastically. Further, none of methods known in the art teach any biocompatible coagulant along with sacrificial electrode material to increase the rate of flocculation/coagulation. The present invention can work as standalone system and/or also can retrofit to the existing flash mixer and dissolved aeration float (DAF) units to enable the possibility of carrying out all the envisaged contaminant removal without adding or with minimal dosing of chemicals. The invention has following advantages:

Combined effect of coagulation and oxidation under small electrical field

Reduced HRT due to the combination of multiple effects, i.e. electrochemical flocculation/coagulation, biocoagulation and electrochemical oxidation.

Single system for multi-faceted treatment against different systems in conventional systems.

Feasibility of reusing the base unit of electrode stack by coating the sacrificial material Effectively handles the shock loads of O&G (up to 5000 ppm), ammonia (up to 5000 ppm), phenols (up to 1000 ppm) and sulfides (up to 200 ppm).

Feasibility of increasing the number of stack arrangement of electrodes as per requirement of volumes Increased redox balance and flocculation effect due to the presence of biologically originated coagulant in minute quantities.

Substantially reduce the chemical requirement

In situ release of coagulants/flocculants with simultaneous generation of free radicals and oxidizing agents The pH control is managed without chemical dosing Removal of emulsified oil content Increased removal of total solids (TS) content Decolorization of wastewater Significantly reduce the BOD and COD content that further reduce the chemical requirement in other units of ETP Reduced biosludge generation from aeration basin Increased water recyclability and reduced fresh water requirement Can be easily adapted to the existing ETP units The present invention is an easy adaptable, highly efficient, sustainable (low chemical requirement) advancement that helps in transformation of existing ETP units towards zero liquid discharge and independent or less dependent of the fresh water requirement.

Figure 1:
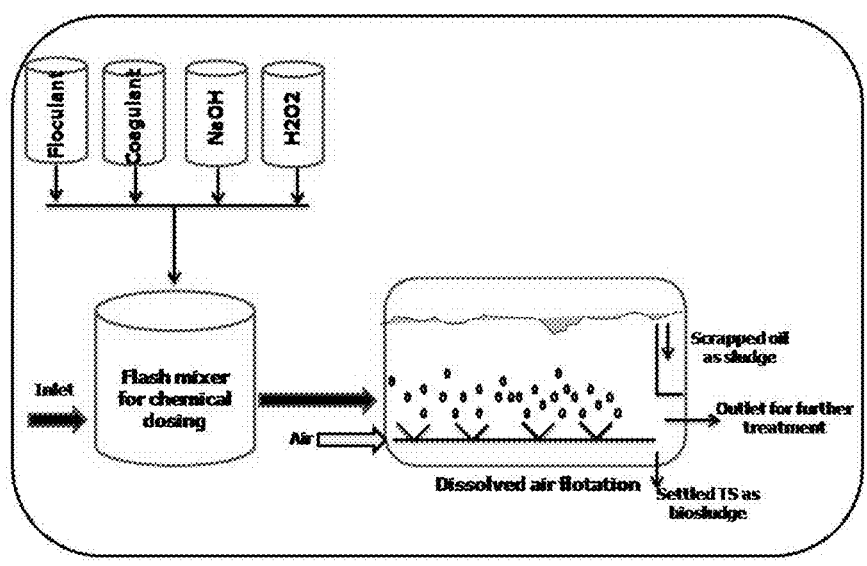
FIG. 1 illustrates typical schematic of primary treatment unit of refinery ETP.

Petroleum wastewater treatment is a complex process having different unit operations. Especially, the treatment of oil based contaminants of wastewater, needs primary chemical treatment to remove the emulsified oil contents, phenolics, suspended solids, sulfides, etc., and to balance the pH, before subjecting to the biological unit operations (anaerobic digester, bio-tower, aeration basin, etc.). FIG. 1 shows the typical primary treatment unit of refinery ETP. Fluctuations in pH, foam generation, shock loads of oil, alkalinity or other streams is very common issues arise in these types of wastewaters. Whenever, there is significant alterations in feed quality, the impact will directly or indirectly hit biological section also and overall the effluent quality will go beyond the designated standards. Further, the sudden shock loads into ETP also cause destabilization of routine operation due to the design limits. To manage this situation, most of the times the chemical dosing will be increased in the primary treatment, which increase the chemical load on wastewater. This will create a situation of surplus non-dischargeable and non-recyclable effluent along with increased requirement of fresh process water for on-going processing. This is very critical situation for industry to manage the large quantities of undesirable effluents and also there will be huge impact on the operational expenditure in terms of chemical dosing. To avoid this type of situation, following are required:

Balancing the pH without adding any chemical

Effective flocculation and coagulation with no/minimal chemical dosing

Breakdown of complex constituents into simpler molecules before the biological section Faster and efficient primary treatment System that can withstand and handle the shock loads Construction Details of Hybrid Electrode Stack:

The hybrid electrode stack has two parts, sacrificial and high conductive electrodes.

The electrode stack is constructed using combination of working and counter electrodes arranged in alternate sequence and connected in parallel circuit.

The high conductive metal electrodes are based on Ti plates/mesh, stainless steel, carbon steel, mixed metal oxide (MMO) based electrodes ($RuO_2$ or $IrO_2$ coated Ti), and are coated/filled with sacrificial metal sheets/powder/plates arranged alternatively in sequence.

The sacrificial metals on electrodes are aluminum and/or iron or their different forms. The aluminum or iron sheets/plates/powder/nano material will be coated on the Ti plates making a hybrid electrode. The aim of these electrodes is to leach out the metal content (Al and Fe) in a controlled manner into the wastewater and also to generate the free radicals/oxidizing agents that facilitate more flocculation and coagulation.

In addition, biological originated coagulants were also coated/filled along with sacrificial electrode material (Al and Fe) to increase the redox balance and also the rate of flocculation/coagulation. The biocompatible coagulant may include but not limited to Tannic acid, Galacturonic acid, SorbitolChitosan etc.

Further, these hybrid electrode plates are separated by non-conductive spacers to avoid short circuit between the electrodes, especially during the metal leaching.

The hybrid electrodes of Al and/or Fe are to be placed alternative to each other to maintain the alternate electrode plates as anode and cathode.

The electrical circuit connections of the electrode stack are to be maintained in such a way that each type of electrode may act as single set of electrodes, i.e., All aluminum based electrodes should act as either anode or cathode and the same case with iron based hybrid electrodes.

The electrical circuit connections to be pass through the non-conductive spacers and should be able to switch between the charge, i.e., anodic or cathodic, for both the types of electrodes.

Polarity of the electrodes to be changed in intervals of time, preferably between 2-20 min to increase the flocculation.

This allows a provision to reuse the electrode stack just by coating again the Al or Fe sheet/plate/powder/nano material on to the high conductive electrode stack as and when required because the Al and Fe contents slowly get destroyed due to the sacrificial nature. However, the base electrode stack will be constant in place which is equipped with all electrical circuits and other connections.

In case of sacrificial electrode sheet, the biocompatible coagulant is coated using conductive polymer onto the sacrificial electrode. The hybrid electrodes of stack are connected in parallel to ensure the supply of equal applied potential across the stack.

Apart from petroleum, refinery and petrochemical wastewater, the method can be used as clarification unit for any of the wastewater unit to separate the suspended solids and emulsified oils.

The following examples and experiments are for illustrative purposes only and not intended to limit the scope of this disclosure.

EXAMPLES

Example 1: Development of Hybrid Sacrificial Electrode Combination and Optimization Initially, the sacrificial electrode combination was studied, where different forms of Fe and Al electrodes (sheets(s)/powder(p)/nano(n)) were used in different combinations coated onto the high conductive Ti plates and/or MMO ($IrO_2$ coated Ti) based electrodes (Table 1). Experiment was carried out under ambient conditions, and no stirring provided externally to allow the separation of contaminants. The metal ions leached from the electrodes ensured the flocculation of the contaminants and the free radicals/oxidizing agents generated from the high conductive electrodes help for the floating of these flocs to get separated. Further the applied potentials also initiated oxidation reaction and oxidized various contaminants of the wastewater and thus significantly reducing the COD.

TABLE 1

| | | | | | | Metal |
| --- | --- | --- | --- | --- | --- | --- |
| Consolidated data obtained by using different sacrificial electrode combinations | | | | | | |
| | | O&G | TSS | Color | COD | content |
| Sacrificial | Biocompatible | removal | reduction | removal | removal | in sludge |
| Electrode combination | coagulant | (%) | (%) | (%) | (%) | (g/m$^3$) |
| Ti—Fe(s)/MMO-Fe(s) | Chitosan | 91.7 | 84.2 | 89.1 | 78.5 | 50.2 |
| Ti—Al(s)/MMO-Al(s) | Galacturonic acid | 92.5 | 82.6 | 94.2 | 80.2 | 45.6 |
| Ti—Fe(s)/MMO-Al(s) | Tannic acid | 97.3 | 90.6 | 99.1 | 84.6 | 20.1/15.8 |
| Ti—Fe(s)/MMO-Al(p) | Galacturonic acid | 96.8 | 91.1 | 98.8 | 83.7 | 18.3/14.6 |
| Ti—Al(s)/MMO-Fe(n) | Sorbitol | 98.1 | 92.3 | 99.3 | 84.8 | 15.3/21.2 |
| Ti—Fe(n)/MMO-Al(p) | Tannic acid | 97.3 | 91.4 | 99.1 | 84.2 | 20.7/15.3 |

Further to the optimization of electrode pairs, the effect of applied potential on different hybrid electrode combinations was studied. For this, different forms of Fe and Al electrodes (sheets(s)/powder(p)/nano(n)) were used in different combinations coated onto the high conductive Ti plates and/or MMO ($IrO_2$ coated Ti) based electrodes (Table 2). Refinery wastewater was used as model wastewater and studied under applied potential of 2-10V. Experiment was carried out under ambient conditions, and no stirring provided externally to allow the separation of contaminants. The metal ions leached from the electrodes ensured the flocculation of the contaminants and the free radicals/oxidizing agents generated from the high conductive electrodes help for the floating of these flocs to get separated. Further the applied potentials also initiated oxidation reaction and oxidized various contaminants of the wastewater and thus significantly reducing the COD.

TABLE 2

Consolidated data obtained by using Fe/Al electrode combinations under different applied potentials

| Hybrid electrode combination | Applied potential | O&G removal (%) | TSS reduction (%) | Color removal (%) | BOD removal (%) | COD removal (%) | Total Metal content in sludge (g/m³) |
|---|---|---|---|---|---|---|---|
| Ti—Fe(s)/MMO-Fe(s)-Chitosan | 2 V | 1.6 | 4.1 | 0.86 | 6.1 | 7.3 | 5.1 |
| Ti—Al(s)/MMO-Al(s)-Galacturonic acid | 3 V | 32.1 | 41.3 | 10.8 | 44.1 | 51.6 | 15.8 |
| Ti—Fe(s)/MMO-Fe(s)-Tannic acid | 4 V | 91.6 | 79.3 | 73.7 | 58.2 | 71.9 | 22.8 |
| Ti—Al(s)/MMO-Fe(n)-Galacturonic acid | 5 V | 97.3 | 90.6 | 99.1 | 57.3 | 84.6 | 35.9 |
| Ti—Al(s)/MMO-Al(s)-Sorbitol | 6 V | 97.8 | 91.2 | 99.2 | 55.1 | 85.2 | 38.7 |
| Ti—Fe(n)/MMO-Al(p)-Chitosan | 8 V | 98.1 | 92.2 | 99.2 | 54.6 | 86.1 | 48.6 |
| Ti—Fe(s)/MMO-Al(s)-Tannic acid | 10 V | 98.6 | 93.7 | 99.6 | 53.8 | 88.3 | 61.6 |

Example 2: Evaluation Using Different Wastewater

Once the electrode combinations and applied potentials are finalized, the process was evaluated using different waste streams from refinery unit, i.e., typical refinery wastewater and petrochemical wastewater from PTA unit. Table 3 depicts the characteristics of both the wastewater.

the electric field created due to applied potential help in the clear separation of the generated flocs. Further, the free radicals/oxidizing agents generated from the hybrid electrodes help in the oxidation of contaminants present in wastewater and thus significantly reducing the BOD and COD. Table 4 depicts the treatment efficiency obtained using current invention with refinery wastewater and effluent from petrochemical unit.

TABLE 4

Consolidated data obtained by using different wastewater

| Wastewater | O&G removal (%) | TSS reduction (%) | Color removal (%) | BOD removal (%) | COD removal (%) | Metal content in sludge (g/m³) |
|---|---|---|---|---|---|---|
| Refinery wastewater | 97.3 | 90.6 | 99.1 | 57.3 | 84.6 | 35.9 |
| Petrochemical wastewater | 98.3 | 83.4 | 99.3 | 58.6 | 81.3 | 38.6 |

TABLE 3

Characteristics of refinery and petrochemical waste water

| Parameter | Refinery wastewater | Petrochemical wastewater |
|---|---|---|
| pH | 8.4 | 9.7 |
| Oxidation-reduction potential (ORP; mV) | −88.3 | −156.4 |
| Total dissolved solids (TDS; ppm) | 2862 | 3496 |
| BOD (ppm) | 97.3 | 90.6 |
| COD (ppm) | 97.8 | 91.2 |
| O&G (ppm) | 226 | 61 |
| TS (%) | 162 | 247 |

Experiments were carried out using Ti—Al(s)/MMO—Fe(n) as hybrid sacrificial electrode combination. The experiment was carried out under ambient conditions under 5V of applied potential, and no stirring is provided externally to allow the separation of contaminants. Air purging was provided at 2 Kg/cm². The metal ions leached from the electrodes ensured the flocculation of the contaminants and

Example 3: Comparative Evaluation with Conventional Treatment, Electrocoagulation and Electrochemical Oxidation The efficiency of current invention against the conventional treatment process, electrocoagulation process and electrochemical oxidation process was studied for refinery wastewater treatment along with the retention time, reduction in the chemical requirement was compared. Experiment was carried out using refinery wastewater with characteristics defined in Table 3. Details of operation and electrode combinations were given Table 5. The experiment was carried out under ambient conditions under 5V of applied potential, and no stirring is provided externally to allow the separation of contaminants. Conventional process, electrocoagulation and electrochemical oxidation processes were also carried out in similar cell design and volume (total/working volume 1.2 L/1.0 L) except the change in electrode set-up. Conventional experiment was carried out without any electrode set up, while the electrocoagulation experiment was carried out using electrode combination of iron and aluminium. The electrooxidation experiment was carried out using electrode combination of titanium and MMO. Air purging was provided for all the set-ups at 2 kg/cm² to 6 kg/cm², respectively to allow the proper separation of flocs. Table 5 depicts the difference between the treatment efficiency of conventional treatment and present innovation.

TABLE 5

Comparative data of conventional treatment process (as shown in FIG. 1) and present innovation (as shown in FIG. 2) up to just before the biological unit operations

|  | Electrode configuration | O&G removal (%) | TSS reduction (%) | Color removal (%) | BOD removal (%) | COD removal (%) | Phenol removal (%) | HRT (min) |
|---|---|---|---|---|---|---|---|---|
| Conventional process (Flash mixer and DAF) | N/A | 65.6 | 42.4 | 21.3 | 23.8 | 46.7 | 12.6 | 60-90 |
| Electro-coagulation | Fe/Al | 90.6 | 81.3 | 96.3 | 36.4 | 69.7 | 18.2 | 45-60 |
| Electrochemical oxidation | Ti/MMO (RuO$_2$—Ti) | 43.8 | 29.8 | 99.2 | 31.2 | 57.4 | 56.3 | 45-60 |
| Present innovation | MMO (RuCh—Ti)—Al(P)/ Pt—Ti—Fe(P)- Chitosan | 97.3 | 90.6 | 99.1 | 57.3 | 84.6 | 69.7 | 45-60 |

Further to this, the requirement of chemical dosing also varied significantly among the treatment units and present innovation. Table 6 depicts the quantified chemical requirement for each of the treatment unit and present innovation. Significant reduction in chemical requirement observed when present innovation was used.

TABLE 6

Comparative data of major chemicals required during routine operation of refinery ETPs

|  |  | Quantity required (Kg/m$^3$ of wastewater) | | | |
|---|---|---|---|---|---|
| Chemical | Function | Conventional treatment | Electro-coagulation | Electrochemical oxidation | Present innovation |
| NaOH | pH balance | 6.13 | — | — | 0.62 |
| H$_2$SO$_4$ | pH balance | — | 2.64 | 3.21 | — |
| ALUM | Coagulation and flocculation | 2.28 | — | — | — |
| DOPE | Coagulation and flocculation | 1.05 | — | — | — |
| DWPE | Coagulation and flocculation | 0.10 | — | — | — |
| H$_2$O$_2$ | Oxidant | 0.42 | — | — | — |

Apart from the above chemicals, Urea and DAP are also been dosed at 1-1.5 Kg/m$^3$ and 1-1.2 Kg/m$^3$ wastewater respectively, in biological unit operations which comes after primary treatment to support the microbial growth. To study the difference in treatment of effluent from all 3 treatments and the current invention, the effluents (separated of floating oil and suspended solids) were subjected to aerobic treatment in bioreactor (Total/working volume, 2.0/1.5 L) using the bioinoculant used in aeration basin of refineries. Treatment of effluent from electrocoagulation and electrochemical oxidation units have shown the requirement of urea (0.8-1.0 Kg/m$^3$) and DAP (0.75-0.9 Kg/m$^3$) slightly lower than conventional process but higher than present invention as both the processes have not completely eliminated the contaminants. But when the current innovation applied, most of the contaminants were removed in primary treatment unit alone and hence, the loading of contaminants reduced significantly to the biological unit operations. This in turn drastically reduced the requirement of urea (0.2-0.35 Kg/m$^3$) and DAP (0.05-0.20 Kg/m$^3$). Further, the biosludge generated from both the bioreactors was quantified which showed about 2.5 times reduction in sludge quantity, when the present invention was used.

Example 4: Role of Biocoagulant in Redox Balance and Flocculation/Coagulation

The role of biocoagulant in enhancing the efficiency of current invention was studied. Experiment was carried out using refinery wastewater with characteristics defined in Table 3. All the experiments were carried out using Ti—Al (p)/MMO-Fe(n) as hybrid sacrificial electrode combination along with different biocoagulants (Table 7). Said biocoagulants are obtained commercially. The experiment was carried out under ambient conditions under 5V of applied potential, and no stirring is provided externally to allow the separation of contaminants. Air purging was provided for all the set-ups at 2 kg/cm$^2$ to allow the proper separation of flocs. Table 7 depicts the essential role of biocoagulant in the current invention.

TABLE 7

Effect of using biocompatible coagulant along with sacrificial electrode material on treatment efficiency

| Hybrid electrode combination | Biocoagulant | O&G removal (%) | TSS reduction (%) | Color removal (%) | BOD removal (%) | COD removal (%) | Total Metal content in sludge $(g/m^3)$ | HRT (min) |
|---|---|---|---|---|---|---|---|---|
| Ti—Al(p)/MMO-Fe(n) | Nil | 91.3 | 83.6 | 96.1 | 37.3 | 64.6 | 32.9 | 90-120 |
| Ti—Al(p)/MMO-Fe(n) | Chitosan | 98.3 | 92.6 | 99.3 | 54.8 | 83.9 | 37.9 | 45-60 |
| Ti—Al(p)/MMO-Fe(n) | Sorbitol | 97.8 | 91.2 | 99.2 | 55.1 | 85.2 | 38.7 | 45-60 |
| Ti—Al(p)/MMO-Fe(n) | Galacturonic acid | 98.1 | 92.2 | 99.2 | 54.6 | 86.1 | 38.6 | 45-60 |
| Ti—Al(p)/MMO-Fe(n) | Tannic acid | 98.6 | 93.7 | 99.6 | 53.8 | 88.3 | 37.6 | 45-60 |

Example 5: Balancing of Operation During Shock Loads

The current invention can also handle the shock loads of O&G, phenols, ammonia, sulfide, etc., during operation and even at instance of shock loads, the treatment efficiency doesn't go down due to the in situ generation of flocculants/coagulants. All the shock load experiments were carried out using refinery wastewater with characteristics defined in Table 3. Initially normal feeding was carried out and a sudden shock load of designated contaminant was given to the system and the changes in the treatment efficiency of present invention against control (conventional) system was recorded. The experiment was carried out under ambient conditions under 5V of applied potential, and no stirring is provided externally to allow the separation of contaminants. Control experiment was carried out in similar cell design and volume except having any electrode set-up and applied potential. Air purging was provided for both the set-ups at 2-4 $kg/cm^2$ and 6-9 $kg/cm^2$, respectively to allow the proper separation of flocs.

Figure 3:
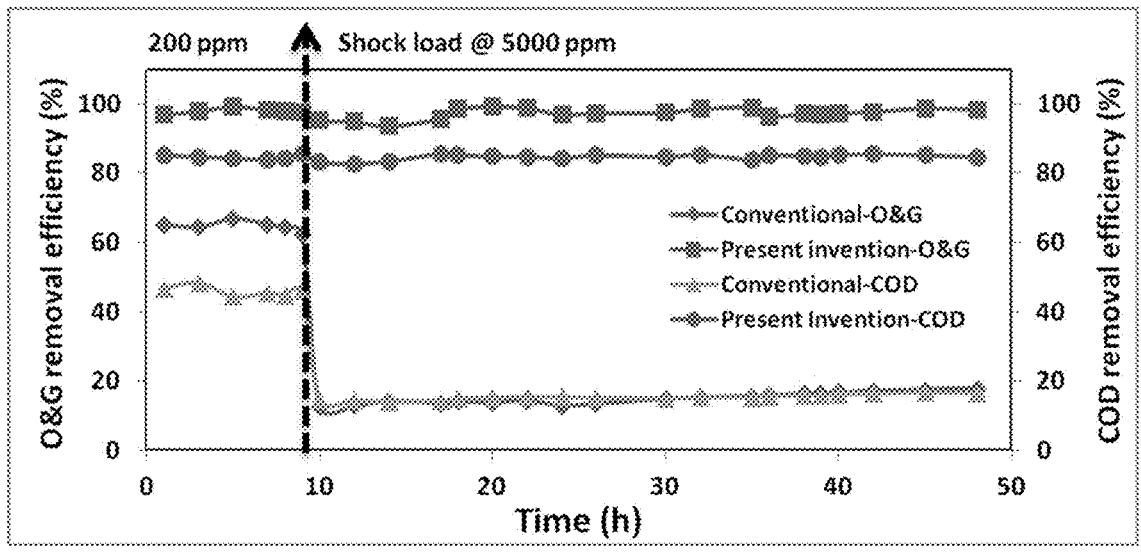
FIG. 3 illustrates change in O&G content and corresponding COD removal efficiency during shock loads.

Shock loads of O&G: Experiments were carried out using MMO (RuO2-Ti)—Al(P)/Pt—Ti—Fe(P)—Chitosan as hybrid sacrificial electrode combination. A continuous flow system was made, and the wastewater allowed feed at 50 ml/h and after 9 hours of operation, shock load of O&G (5000 ppm) was given in the feed tank and allowed the shock load for 8 h and then normal feeding continued. Samples were collected at regular intervals and checked for O&G as well as COD removal efficiency. FIG. 3 shows the change in O&G content and corresponding COD removal efficiency during the 48 h of operation.

Figure 4:
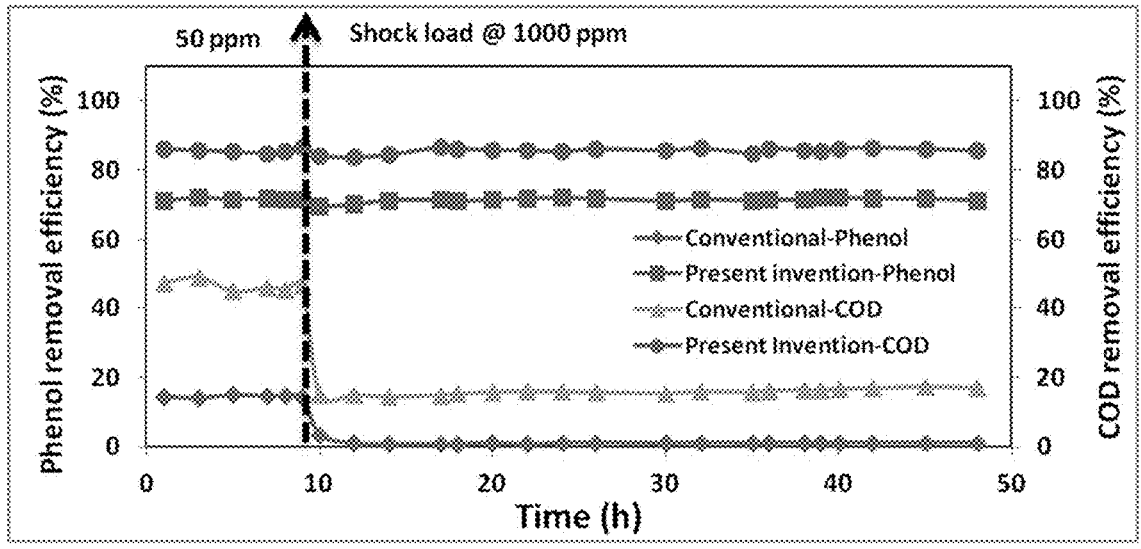
FIG. 4 illustrates change in phenol content and corresponding COD removal efficiency during shock loads.

Shock loads of phenol: Experiments were carried out using MMO (IrO$_2$—Ti)—Al(n)/Pt—Ti—Fe(P)—Galacturonic acid as hybrid sacrificial electrode combination. A continuous flow system was made and the wastewater allowed feed at 50 ml/h and after 9 hours of operation, shock load of phenol (1000 ppm) was given in the feed tank and allowed the shock load for 8 h and then normal feeding continued. Samples were collected at regular intervals and checked for phenol as well as COD removal efficiency. FIG. 4 shows the change in phenol content and corresponding COD removal efficiency during the 48 h of operation.

Figure 5:
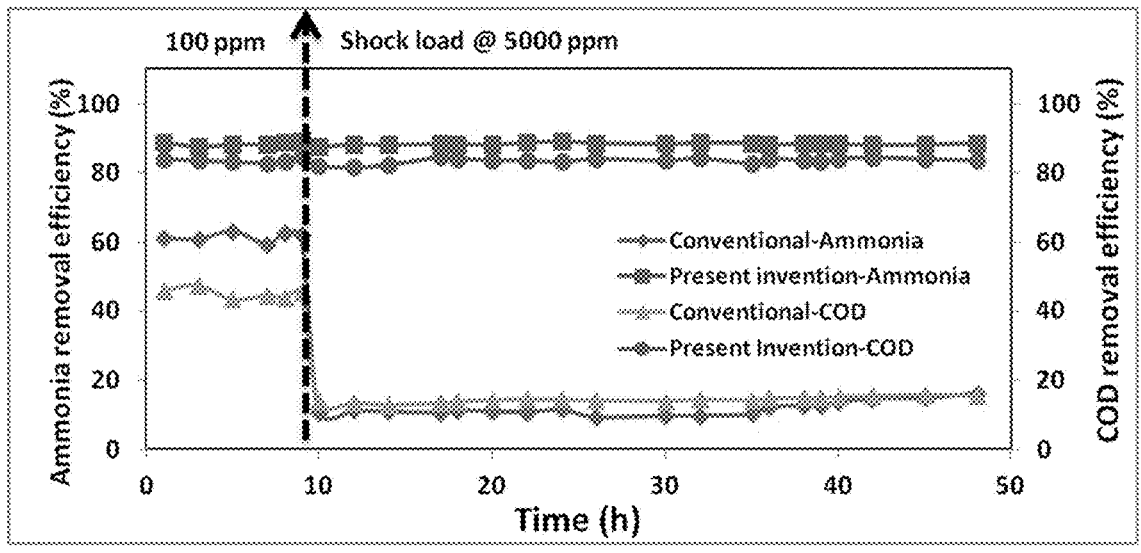
FIG. 5 illustrates change in ammonia content and corresponding COD removal efficiency during shock loads.

Shock loads of ammonia: Experiments were carried out using Ti—Al(s)/MMO-Al(s)—Sorbitol as hybrid sacrificial electrode combination. A continuous flow system was made and the wastewater allowed feed at 50 ml/h and after 9 hours of operation, shock load of ammonia (5000 ppm) was given in the feed tank and allowed the shock load for 8 h and then normal feeding continued. Samples were collected at regular intervals and checked for ammonia as well as COD removal efficiency. FIG. 5 shows the change in ammonia content and corresponding COD removal efficiency during the 48 h of operation.

Figure 6:
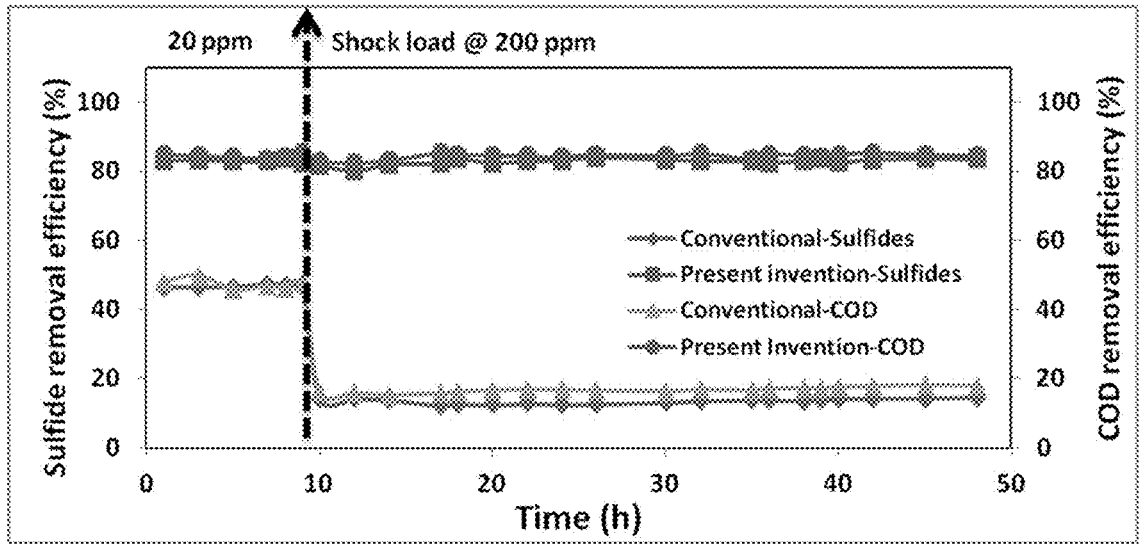
FIG. 6 illustrates change in sulfide content and corresponding COD removal efficiency during shock loads.

Shock loads of sulfides: Experiments were carried out using Ti—Fe(s)/MMO-Al(s)—Tannic acid as hybrid sacrificial electrode combination. A continuous flow system was made and the wastewater allowed feed at 50 ml/h and after 9 hours of operation, shock load of sulfide (200 ppm) was given in the feed tank and allowed the shock load for 8 h and then normal feeding continued. Samples were collected at regular intervals and checked for sulfides as well as COD removal efficiency. FIG. 6 shows the change in sulfide content and corresponding COD removal efficiency during the 48 h of operation.

Further to this, the chemical dosing varied significantly between the conventional treatment and present innovation based on the shock loads. Table 8 depicts the quantified chemical requirement for conventional treatment and present innovation. Significant reduction in chemical requirement observed when present innovation was used in place of conventional chemical dosing.

TABLE 8

Quantitative data of required chemicals during conventional operation and current invention against shock loads

| Chemical | Function | Dosing unit in ETP | Quantity required (Kg/m$^3$ of wastewater) | |
|---|---|---|---|---|
| | | | Conventional treatment | Present innovation |
| NaOH | pH balance | pH balance tank | 6.5-8.1 | 0.6-0.85 |
| ALUM | Coagulation and flocculation | Flash mixer | 2.2-4.9 | — |
| DOPE | Coagulation and flocculation | Flash mixer | 0.95-2.1 | — |
| DWPE | Coagulation and flocculation | Flash mixer | 0.12-0.48 | — |
| H$_2$O$_2$ | Oxidant | Flash mixer | 0.28-1.16 | — |

Apart from the above chemicals, Urea and DAP are also needed to be dosed in high quantity in biological unit operations to support and sustain the microbial growth under shock load conditions. However, the current innovation reduces the shock loads to maximum extent in the primary treatment alone and most of the contaminants were removed in primary treatment unit alone. Hence, the chemical loading is reduced significantly in the biological unit operations. In addition to chemical requirement, the reduction in air pressure requirement by using current invention has been depicted in Table 9, which is significantly reduced.

TABLE 9

Comparative air pressure requirement in DAF unit for conventional
treatment and present innovation during shock loads

| Waste water | Air pressure (kg/cm$^2$) | Saturation in liquid (ppm) |
|---|---|---|
| Conventional process | 6-9 | 6-7 |
| Present innovation | 2-4 | 7-8 |

Technical advantages of the present invention:

Reduced retention time due to faster and efficient treatment;

Reduction in number of units for multiple contaminants as the current invention helps in multi-faceted removal of components;

Presence of bio-compatible coagulant helps in increased flocculation/coagulation and redox balance of the system;

Effectively handles the shock loads of all major components O&G, ammonia, phenols, sulfides, etc.;

Reduce the chemical dosing requirement;

Reduce or eliminate the use of oxidizing agents;

Reduce biosludge generation.

It will thus be seen that the objects set forth above, among those made apparent from the preceding description, are efficiently attained, and since certain changes may be made in the constructions set forth without departing from the spirit and scope of the invention, it is intended that all matter contained in the above description shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. These and other modifications of the preferred embodiments as well as other embodiments of the invention will be obvious from the disclosure herein, whereby the foregoing descriptive matter is to be interpreted merely as illustrative of the invention and not as a limitation.

Finally, to the extent necessary to understand or complete the disclosure of the present invention, all publications, patents, and patent applications mentioned herein are expressly incorporated by reference therein to the same extent as though each were individually so incorporated.

The invention claimed is:

1. A method for treating wastewater from a refinery, the method comprising:

passing the wastewater through a hybrid electrode stack, wherein the hybrid electrode stack comprises:

a first part comprising a plurality of hybrid working electrodes, wherein the plurality of hybrid working electrodes comprises high conductive metal electrodes;

a second part comprising a plurality of hybrid counter electrodes arranged in an alternate sequence and connected in a parallel circuit with the plurality of hybrid working electrodes of the first part to form a stack;

a non-conductive spacer positioned between the first part and the second part to avoid short circuit between the plurality of hybrid working electrodes, and the plurality of hybrid counter electrodes, wherein the first part and second part are mounted on the non-conductive spacer either vertically or horizontally;

wherein the high conductive metal electrodes are coated, filled, or mixed with a sacrificial metal along with biocompatible coagulants; wherein the sacrificial metal is aluminum (Al), or iron (Fe); and the biocompatible coagulants are selected from the group consisting of tannic acid, galacturonic acid, sorbitol, and chitosan, wherein the high conductive metal electrodes coated, filled or mixed with Al are aluminum electrodes, and wherein the high conductive metal electrodes coated, filled or mixed with Fe are iron electrodes.

2. The method as claimed in claim 1, wherein the sacrificial metal is in the form selected from the group consisting of sheets, plates, powder and nano material.

3. The method as claimed in claim 1, wherein the aluminum electrodes and the iron electrodes are configured to leach out aluminum, and iron respectively in a controlled manner into the refinery wastewater to generate free radicals or oxidizing agents to facilitate flocculation, or coagulation, and then separation of emulsified oil and suspended solids in the refinery wastewater, and wherein the free radicals or oxidizing agents are hydronium ions, hydroxyl radicals, or nascent oxygen.

4. The method as claimed in claim 1, wherein the biocompatible coagulants are configured to increase the redox balance and the rate of flocculation or coagulation.

5. The method as claimed in claim 1, wherein the biocompatible coagulants are mixed at 0.5% (w/w) of the sacrificial metal.

6. The method as claimed in claim 1, wherein the high conductive metal electrodes are titanium (Ti) plates or mesh, stainless steel, carbon steel, or mixed metal oxide (MMO) based electrodes.

7. The method as claimed in claim 6, wherein the mixed metal oxide (MMO) based electrode is titanium coated by ruthenium oxide (RuO$_2$) or iridium oxide (IrO$_2$).

8. The method as claimed in claim 1, wherein the hybrid electrode stack is provided with electrical circuit connections, and the electrical circuit connections are configured to maintain the aluminum electrodes as a cathode, and the iron electrodes as an anode, or the aluminum electrodes as an anode, and the iron electrodes as a cathode.

9. The method as claimed in claim 8, wherein the electrical circuit connections pass through the non-conductive spacers and switch between an anodic or a cathodic charge of the aluminum electrodes, and a cathodic or an anodic charge of the iron electrodes.

10. The method as claimed in claim 1, wherein polarity of the aluminum electrodes, and the iron electrodes is changed between 2-20 mins.

11. The method as claimed in claim 1, wherein the plurality of hybrid working electrodes, and the plurality of hybrid counter electrodes are flat plate or cylindrical.

12. The method as claimed in claim 1, further comprising applying electrical potential to the plurality of hybrid working electrodes, and the plurality of hybrid counter electrodes, and wherein the applied electrical potential is between 5-10 V direct current (DC).

13. The method as claimed in claim 1, wherein the method reduces a chemical dosing requirement and an air purging requirement by 75-80%.

14. The method as claimed in claim 1, wherein the hybrid electrode stack is retrofitted in a flash mixer, dissolved air flotation (DAF) units, or placed as a separate unit in a refinery effluent treatment plant.

15. The method as claimed in claim 1, wherein the wastewater is passed at a flow rate to maintain hydraulic retention time (HRT) of 45-60 mins and at ambient pressure.

16. The method as claimed in claim 15, wherein the hydraulic retention time (HRT) is 50-55 mins.

17. The method as claimed in 1, wherein the method is characterized to result treated water with a purity of 80 to 85%.

\* \* \* \* \*